US006959147B2

(12) United States Patent
Manico et al.

(10) Patent No.: US 6,959,147 B2
(45) Date of Patent: Oct. 25, 2005

(54) DIGITAL ONE-TIME-USE CAMERA SYSTEM

(75) Inventors: Joseph A. Manico, Rochester, NY (US); John R. Fredlund, Rochester, NY (US); Thomas J. Murray, Cohocton, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/688,037

(22) Filed: Oct. 17, 2003

(65) Prior Publication Data

US 2005/0084259 A1 Apr. 21, 2005

(51) Int. Cl.[7] ............................................... G03B 17/24
(52) U.S. Cl. ........................................ 396/6; 396/311
(58) Field of Search ............................ 396/6, 311, 429

(56) References Cited

U.S. PATENT DOCUMENTS

| | | | |
|---|---|---|---|
| 5,587,752 A | 12/1996 | Petruchik | 396/315 |
| 6,104,877 A * | 8/2000 | Smart et al. | 396/6 |
| 6,628,895 B2 | 9/2003 | Fredlund et al. | 396/5 |
| 6,714,736 B2 * | 3/2004 | Manico et al. | 396/311 |

FOREIGN PATENT DOCUMENTS

| | | | |
|---|---|---|---|
| EP | 1 120 728 A2 | 1/2001 | G06F/17/60 |
| EP | 1 132 877 A2 | 9/2001 | G07F/17/26 |
| EP | 1 182 858 A2 | 2/2002 | H04N/1/00 |
| EP | 1 213 909 A2 | 6/2002 | H04N/1/00 |

* cited by examiner

*Primary Examiner*—W. B. Perkey
(74) *Attorney, Agent, or Firm*—Stephen H. Shaw

(57) ABSTRACT

A method for specialized photofinishing goods and/or services produced from a one-time-use camera, including providing a label on the one-time-use camera, with at least one area containing first instructional information, that identifies particular photofinishing goods and/or services to be applied to images captured by the one-time-use camera. Subsequently, displaying a second instructional information according to the first instructional information. Finally, capturing a second instructional information onto a film residing in the one-time-use camera and resulting in a latent image, the second instructional information for use by a photofinisher for producing the specialized photofinishing goods and/or services from latent images on the film.

29 Claims, 5 Drawing Sheets

US 6,959,147 B2

DIGITAL ONE-TIME-USE CAMERA SYSTEM

FIELD OF THE INVENTION

The invention relates generally to the field of photofinishing, and in particular to customized or specialized photofinishing. More specifically, the invention relates to a method and system utilizing a unique, affixed label on a camera to indicate to a photofinisher that specific specialty types of goods and/or services are requested.

BACKGROUND OF THE INVENTION

Photofinishing modifications are often made on the basis of film type. However, the details of modification are limited to specific treatments for specific film types. Specialty photofinishing is not encouraged since detection and execution of different processing features disrupts the photo processing environment.

What is needed is a simple and reliable means for delivering a request for specialty photofinishing to the photofinisher. The requested type of photofinishing must also be communicated to the consumer. Printing a data frame on film is well known. It is possible to simultaneously expose a data frame and print, by means of ink jet technology, on the camera label; however, labels are conventionally printed and applied in different operations in the manufacturing process. Also, the label has to be customized at a speed that is equal to the exposure rate of the data frame.

The APS film system reads a number from the label that will be applied to the film cassette and exposes that number to the film. However, that number is not read from a camera, and it is not used to make any determination of film processing.

A need exists for easily communicating to a photofinisher specialty type film processing as explicitly requested by the consumer or implicitly from the consumer's use of the camera.

SUMMARY OF THE INVENTION

The present invention is directed to overcoming one or more of the problems set forth above. Briefly summarized, according to one aspect of the present invention, a method for specialized photofinishing goods and/or services produced from a one-time-use camera, including providing a label on the one-time-use camera, with at least one area containing first instructional information, that identifies a particular photofinishing goods and/or services to be used with images captured by the one-time-use camera. Subsequently, displaying a second instructional information according to the first instructional information. Finally, recording a second instructional information onto a film residing in the one-time-use camera and resulting in a latent image, said second instructional information for use by a photofinisher for producing the specialized photofinishing goods and/or services from latent images on said film.

Another aspect of the present invention provides a method for obtaining photofinishing goods and/or services, including capturing an image of a public target associated with photofinishing goods an/or services and subsequently, forwarding the captured image of the public target to a photofinisher. Finally, the user obtains at least one photofinishing good and/or service according to information associated with the public target.

BRIEF DESCRIPTION OF THE DRAWINGS

The above aspects, features, and advantages of the present invention will become more apparent when taken in conjunction with the following description and drawings wherein identical reference numerals have been used, where possible, to designate identical features that are common to the figures, and wherein.

To facilitate understanding, identical reference numerals have been used, where possible, to designate identical elements that are common to the figures.

DETAILED DESCRIPTION OF THE INVENTION

The present invention provides a means for communicating the desired type of specialized photofinishing to both the consumer and the photofinisher.

Figure 1:
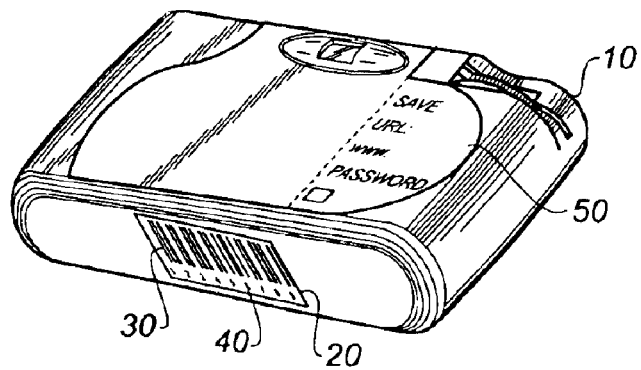
FIG. 1 is a perspective view of a one-time use camera with an external printed unique code.

Referring to FIG. 1, a one-time-use camera 10 (herein after referred to as OTUC 10) with a pre-exposed image frame that includes an affixed label 20 that has written upon it a machine readable code 30 or a human readable code 40 to alert a photofinisher that the OTUC 10 requires a specialized photo finishing service. Machine readable code 30 and human readable code 40 may be combined such as in characters designed for optical character recognition and written upon label 20. Label 20 may also include a detachable receipt 50 that has written upon it a URL internet address for receipt or ordering of photofinishing goods and/or services. These photofinishing goods and/or services may be accessed with a password that is included with detachable receipt 50. Furthermore, label 20 may be an RF tag with a unique ID code capable of being linked to a database that includes other photofinishing ID codes.

Figure 2:
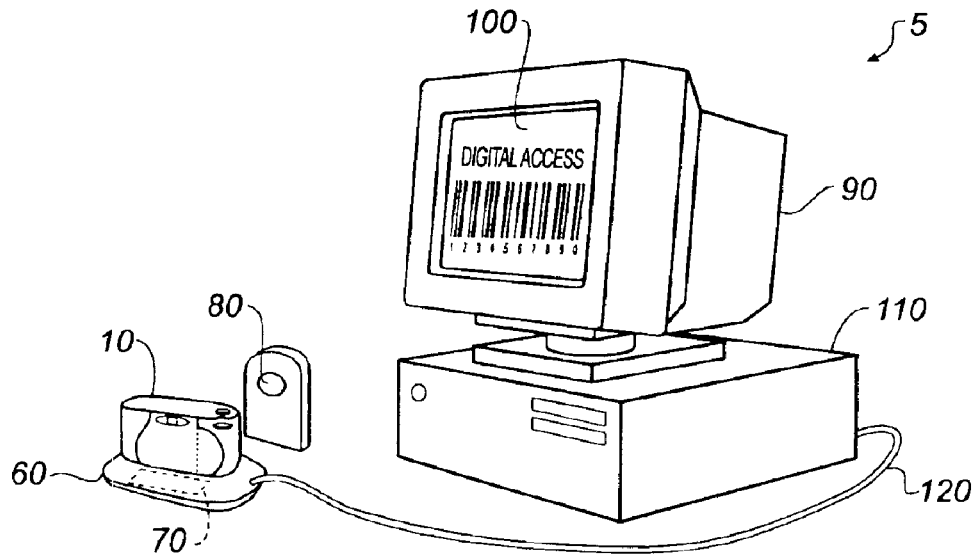
FIG. 2 is a perspective view of a digital system for exposing the unique code obtained from the printed label to the film data frame within the one-time-use camera.

Referring to FIG. 2, a system 5 includes a OTUC 10 and a camera retaining fixture 60 with the ability to read label 20 via barcode reader 70. In lieu of using barcode reader 70, the camera may include an RF tag to automatically communicate information via an RF reader (not shown). In a preferred embodiment, this label is permanently affixed to the OTUC, but that need not be the case. The label may be temporary or detachable in the manufacturing process.

Diopter 80 is employed to reduce the distance from soft display 90 and OTUC 10 in camera retaining fixture 60 while maintaining good focus. A database is also employed to associate the unique ID to a specified photofinishing service such as "internet access."

Label 20 with a specialized marking or other means of communication such as an RF tag is affixed to the OTUC. The case of the label will be described by way of example and not limitation. Label 20 alerts the purchaser that the film from this OTUC will be printed or otherwise acted upon by the digital photofinishing system to create the desired output. In a preferred embodiment, camera 10 is an OTUC capable of taking pictures underwater such as the Kodak's Max Water & Sport®. Label 20 on OTUC 10 contains instructional information such as machine readable code 30 and human readable code 40. The instructional information alerts the digital photofinishing system that appropriate photofinishing such as Eastman Kodak's Sea Processing® is to be applied to the developed images.

FIG. 2 shows OTUC 10 in camera retaining fixture 60. Barcode reader 70 reads machine readable code 30 and sends it to computer 110 by means of fixture/computer linkage 120. Alternately, an electronic camera can be used in place of barcode reader 70. In this example, linkage 120 is shown as a wire, but other means such as wireless transmission may be employed. Computer 110 uses machine readable code 30 to select a displayed image 100 for display on soft display 90. Displayed image 100 may be an image of machine readable code 30 or some other image. OTUC 10 now opens its shutter and an exposure of displayed image 100 is made. Focusing the exposure of displayed image 100 is accomplished by use of an ancillary optical means for focusing, such as a close up diopter 80. The film in OTUC 10 may be advanced so that the exposed frame is not double exposed, or it may be advanced by the user of OTUC 10.

Figure 3:
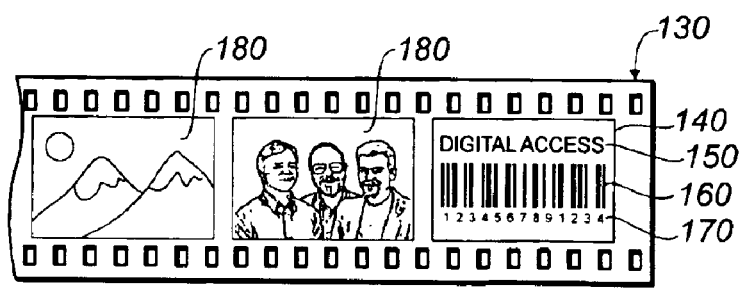
FIG. 3 is a front view of a section of an exposed and processed film strip including data and image frames.
Figure 4:
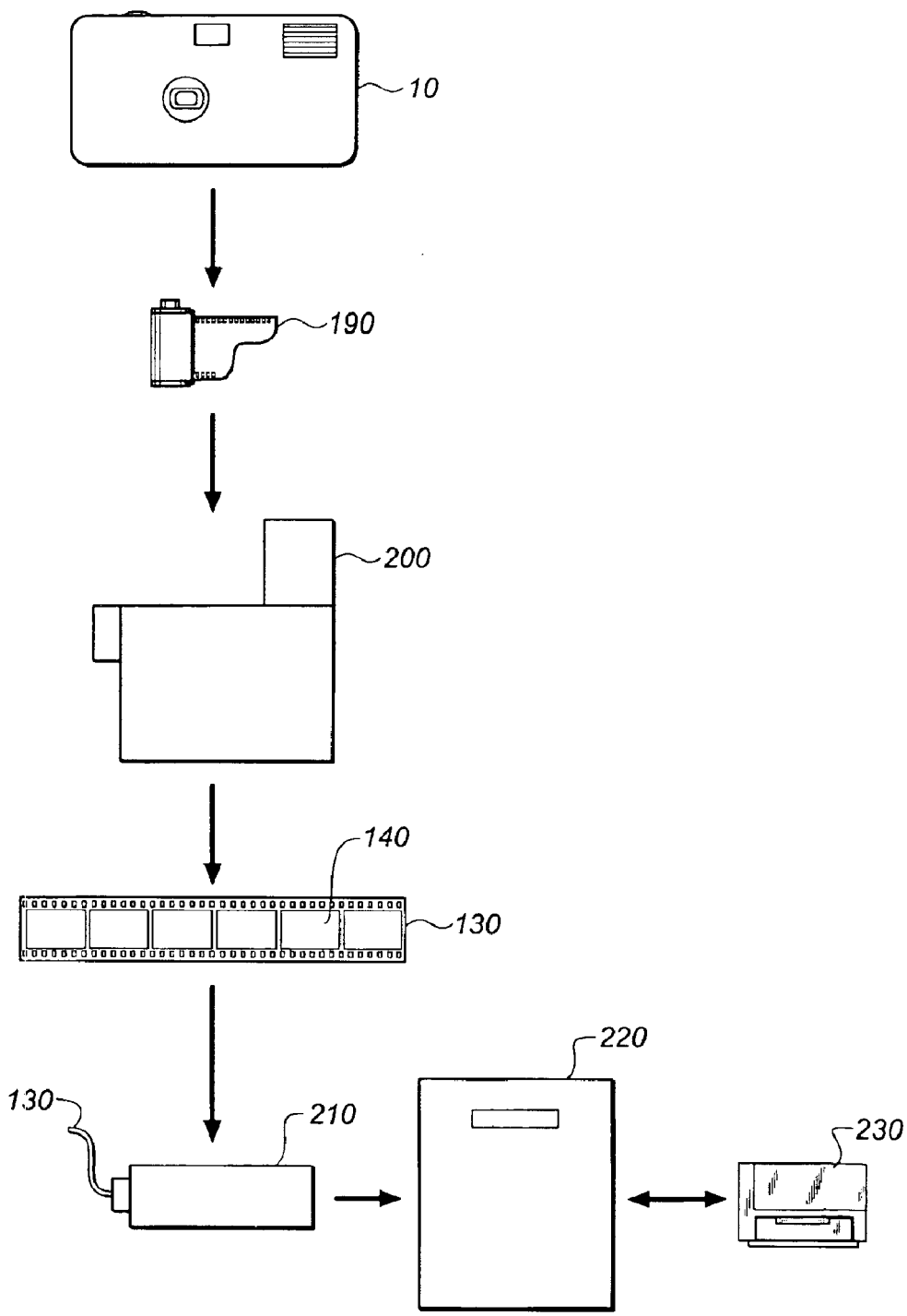
FIG. 4 is a diagram of a system for obtaining the unique ID from the data frame.

Referring to FIGS. 3 and 4, the user obtains OTUC 10 in the traditional manner at retail and captures his desired images. When the photofinisher receives the OTUC 10, exposed film 190 is extracted from OTUC 10 and processed in the film processor 200. Processed film strip 130 is scanned in scanner 210. Image server 220 identifies the scanned images as conventional images 180 or data frame 140. Data frame 140 may have instructional information within it, and be in the form of a unique ID. Upon detecting data frame 140, image server 220 reads machine readable unique ID 160 and applies the desired algorithm to the captured images. In this example, Sea Processing® from Eastman Kodak Company is applied to the images taken underwater so that their appearance is improved. Modified image files are sent to digital printer 230 where they are printed. Data frame 140 may not be printed.

When the film is processed in film processor 200 and scanned with scanner 210, machine readable unique ID 160 in data frame 140 is read by the scanner 210. Alternatively, the human readable unique ID 150 could be read by scanner 210 and interpreted by Optical Character Recognition (OCR) software. The unique ID number is now available to be used to access the database to provide the designated photofinishing service.

Alternatively, human readable unique ID 170 could be used by an operator to key the appropriate photofinishing. This human readable unique ID 170 may be used by a photofinisher who does not understand the meaning of the machine readable unique ID 160 to provide the appropriate photofinishing. This photofinisher may not have the algorithms indicated by the unique ID and can use the human readable unique ID 170 information to key photofinishing similar to the desired type.

Figure 5:
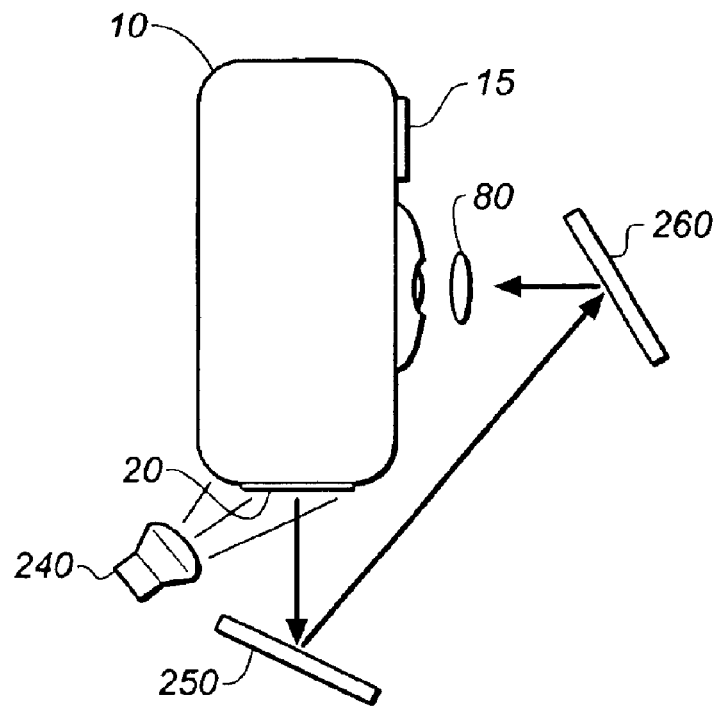
FIG. 5 is a perspective view of an analog system for exposing the unique code obtained from the printed label to the film data frame within the one-time-use camera.

Another method of exposing data frame 140 can be via a folded optical path as shown in FIG. 5. Instead of reading a number and having OTUC 10 capture an image on a soft display, OTUC 10 can be used to provide an exposure of label 20 on the camera itself. Thus, the exposure of the data frame 140 is actually a captured image of the label 20. Light source 240 illuminates label 20. An image of label 20 is reflected by mirrors 250 and 260. The close up diopter 80 provides appropriate focus and magnification for OTUC 10 to expose data frame 140'. Another optical path (not shown) may be provided to illuminate the label 20 with the light from a flash 15 on OTUC 10.

The designated photofinishing service can be many different services depending on the unique ID. The aforementioned Sea Processing® is one example. The service could be as simple as backprinting the date or a logo on the back of the prints. The specialization of the service could go as far as a different specialized service for each camera.

If there is a means for detecting a switchable condition, such as in the well known APS system, during the time the consumer is taking images, the service could be requested for less than all the exposures for a single camera. Thus, the specialized service designated by data frame 140 can be selected for some pictures and not others.

Figure 6:
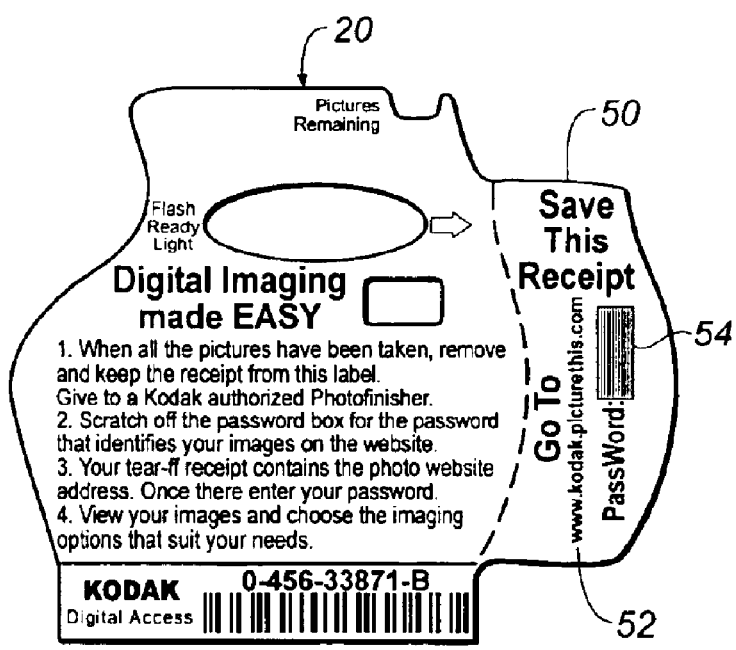
FIG. 6 is an exemplary label for a one-time use camera having a detachable receipt and externally printed unique code.

FIG. 6 shows label 20 with detachable receipt 50 with a completely unique code. Label 20 has some unique identifier that distinguishes it from all others. In this case, detachable label 50 carries URL 52 or a number that corresponds to a URL. Additionally, the label 20 carries password 54 that is obscured from view by a scratch off coating. A database is also employed to associate the unique code to a specified photofinishing service such as "internet access." This unique code is exposed to the film in the OTUC 10, in this case a one-time-use camera, by the method described above. When the consumer has the film processed after capturing images, the code is read and the scanned images are posted to URL 52 on the detachable receipt 50 and the consumer can access the images on that site by using the password 54. This demonstrates the potential of using the invention to control photofinishing via the unique exposure on the film.

The method allows a unique ID to be applied to film in each OTUC 10. The unique ID allows the images from each OTUC 10 to be handled differently. In this case, the images from each individual OTUC 10 are posted to a different URL 52 and accessed only by a specific password 54 that may be different for each OTUC 10. Note that if the database contains password 54 associated with URL 52, password 54 may also be included in the exposure on data frame 140. This allows the user to access images posted to URL 52 without the detachable receipt 50 if negatives are returned, or if the URL 52 and password 54 are printed along with any prints returned with the order. Additionally, password 54 may be printed with an ink only visible under special lighting conditions. The website corresponding to URL 52 may also provide a means for image storage and access to selecting alternative types of images, including, but not limited to: big prints, sentiments, greetings, multiple images, digital zoom instruction, panoramic instruction, DVD orders, CD orders, or large index print orders.

Data frame 140 may also include security information. Watermarks (not shown) or other security measures can be included to determine authenticity of the data frame 140. This may be important if the purchase price includes an extra cost for the specialized photofinishing service. The photofinisher can detect the watermark and look up in a database provided by the camera manufacturer the validity of the service for the unique ID.

Figure 7:
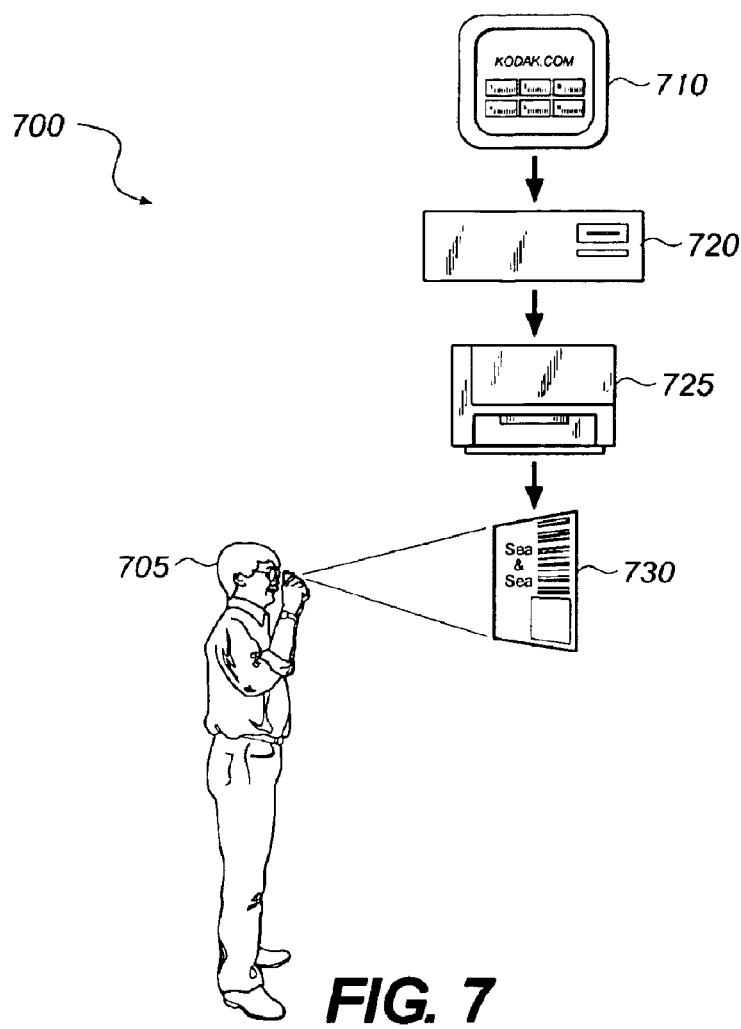
FIG. 7 is an exemplary system according to the present invention for creating targets.

Referring to FIG. 7, a system 700 is described for providing targets to control photofinishing. The system 700 includes a touch screen monitor 710 which provides a means for selecting photofinishing goods and/or services; a computer 720; a printer 725; and a target 730 used for providing photofinishing control codes. A user 705 selects photofinishing goods and/or services on monitor 710 and computer 720 directs printer 725 to print appropriate target 730. Subsequently, the user 705 captures an image of target 730. Alternatively, user 705 may capture an image of monitor 710 directly.

Similarly, the user 705 could be instructed to go to www.kodak.com\specials and see a myriad of options for 'programming' the OTUC 10. The web interface would allow the user to print out an 8.5×11 sheet which would have instructions for exposing one frame from the camera (e.g. place printout on floor—place toes on edge of sheet—in standing position take picture of printout, etc.).

Figure 8:
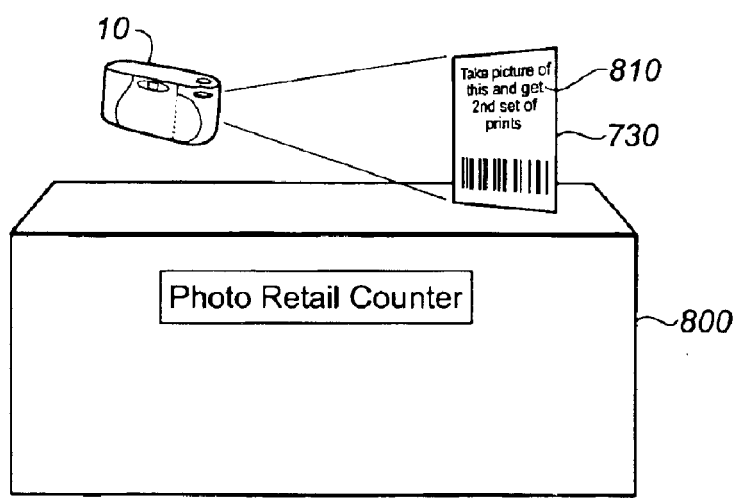
FIG. 8 is an example of a pre-printed target for use in retail locations.

Referring to FIG. 8, a target 730 is provided by a retailer for placement on photo retail counter 800. A user 705 is encouraged by an explicit message 810 on target 730 to capture an image of target 730. This image capture results in a creation of data frame 140, as shown in FIG. 3. The user 705 receives specialized photofinishing, such as a free second set of prints when the photofinisher reads data frame 140.

Figure 9:
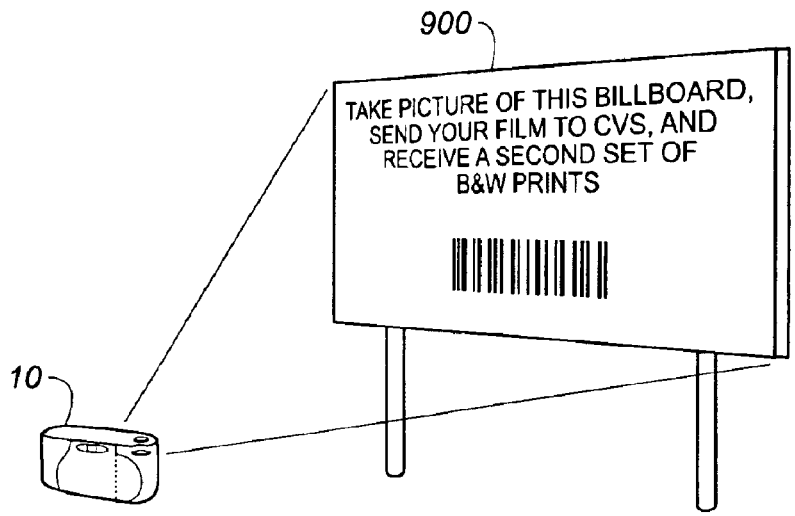
FIG. 9 is an exemplary billboard used for creating targets.

Referring to FIG. 9, another way to create the data frame 140 is to provide public targets for consumers in public places or theme locations, etc. A billboard 900 shows enticing instructions, such as, "Take a picture of this billboard and send your film to CVS and get a second set of B&W prints." Another embodiment would have consumers at a sporting event capture at certain times a large outdoor display screen, such as a Jumbo-Tron™ screen, displaying a target label. (Not shown) The camera users would be encouraged to take a picture of the Jumbo-Tron™ and send their film to a specific photofinisher for a special service such as, a free 8×10 of a winning touchdown or bordered prints with a sporting events theme (e.g., football, baseball, soccer, etc.) Capture of the billboard or Jumbo-tron image can be accomplished with any camera, including film or digital, and is not limited to OTUC 10.

Figure 10:
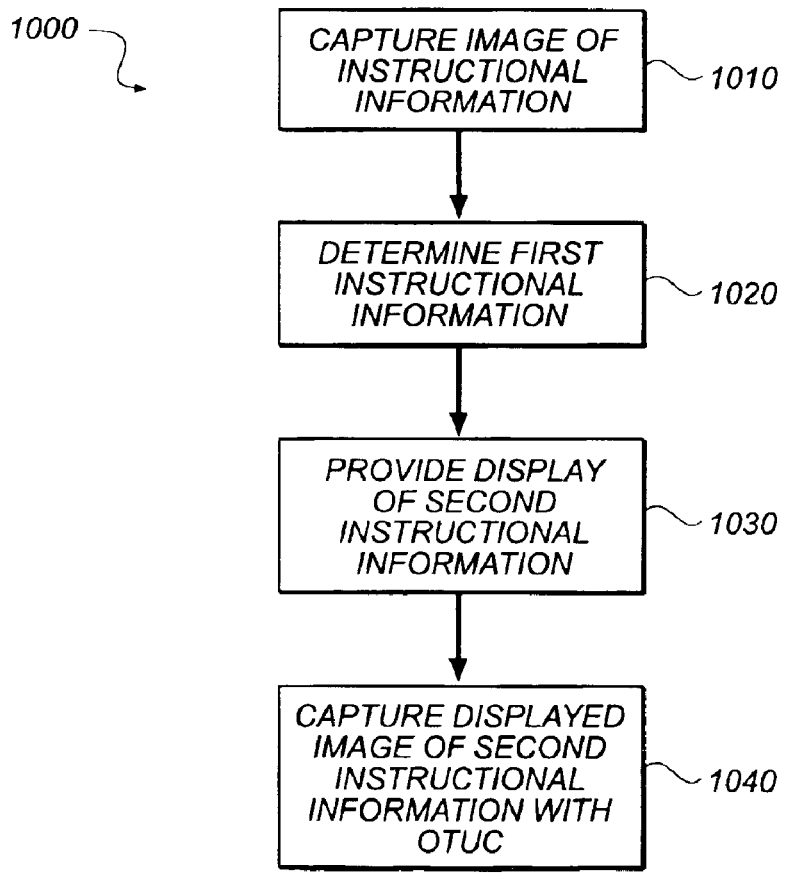
FIG. 10 is an exemplary flowchart of capturing and displaying instructional information associated with specialized photofinishing goods and/or services.

Referring to FIG. 10, a flowchart 1000 describing a series of operations for capture and display of instructional information associated with specialized photofinishing goods and/or services is shown. Operation 1010 requires image capture of instructional information on label 20, the instructional information comprising machine readable code 30 or human readable code 40. A determination of requested specialized photofinishing goods and/or services from a first instructional information source occurs in operation 1020. Operation 1030 requires a display of second instructional information (second instructional information is based on first instructional information); whereupon, operation 1040 requires image capture of the second instructional information via OTUC 10.

Also, the specialized service could be applied to only sections of the film order. The consumer could take a picture of target label 1 (B&W prints) and expose several pictures in that 'mode' then decide they would like color prints for the next several frames—so they would expose another frame with target label 2 (Color prints) and then decide for the remainder of the order they would like Cartoon prints (exposing another target label). So at the photofinishing system the targets would be valid until another target is detected or until the end of the order. This technique may also be used by digital cameras. The first image exposed with a target may alert a photofinisher or software receiving the digital images that the next images in sequence are desired to be handled in some special fashion. A second target or a second exposure of the first target may indicate that the user desires to return to normal image handling.

The invention has been described with reference to a preferred embodiment. However, it will be appreciated that variations and modifications can be effected by a person of ordinary skill in the art without departing from the scope of the invention.

PARTS LIST

5 system
10 one-time-use camera
15 flash
20 label
30 machine readable code
40 human readable code
50 detachable receipt
52 URL
54 password
60 camera retaining fixture
70 barcode reader
80 diopter
90 soft display
100 displayed image
110 computer
120 camera retaining fixture/computer linkage
130 processed film strip
140 data frame
150 human readable unique ID
160 machine readable unique ID
170 human readable unique ID
180 image frame
190 exposed film roll
200 film processor
210 film scanner
220 image server
230 digital printer
240 light source
250 mirror
260 mirror
Parts List—Continued
700 system
705 user
710 touch screen monitor
720 computer
725 printer
730 target
800 retail counter
810 message
900 billboard
1000 flowchart
1010 capture image of instructional information
1020 determinization of requested specialized photofinishing goods and/or services
1030 display second instructional information
1040 image capture of second instructional information

What is claimed is:

1. A method for obtaining specialized photofinishing goods and/or services produced from a one-time-use camera, comprising the steps of:

a) providing a label on the one-time-use camera, with at least one area containing first instructional information that identifies particular photofinishing goods and/or services to be used with images captured by the one-time-use camera;

b) capturing a first instructional information from the label;

c) displaying a second instructional information according to the first instructional information; and d) recording a second instructional information onto a film residing in the one-time-use camera and resulting in a latent image, said second instructional information for use by a photofinisher for producing the specialized photofinishing goods and/or services from latent images on the film.

2. The method claimed in claim 1, wherein the first instructional information and the second instructional information are the same.

3. The method claimed in claim 1, wherein the first instructional information is machine readable code.

4. The method claimed in claim 1, wherein the first instructional information is human readable code.

5. The method claimed in claim 1, wherein the second instructional information is a data frame on the film.

6. The method claimed in claim 1 wherein the step of displaying the second instructional information includes an ancillary optical means for focusing the one-time-use camera onto a display device.

7. The method claimed in claim 1 wherein the step of capturing a first instructional information includes employing a label reader selected from the group consisting of a document scanner, a machine code reader, and an optical character recognition (OCR) equipped scanner.

8. The method claimed in claim 1 wherein the means for displaying the second instructional information includes employing an electronic camera or barcode reader for transferring an image of the label to a processor, whereby the processor deciphers the first instructional information on the label.

9. The method claimed in claim 8 wherein a display device displays the image of the label, provided by the processor, for capture by the one-time-use camera.

10. The method claimed in claim 1, wherein the step of recording the second instructional information further includes:

c1) capturing the second instructional information from the display device.

11. The method claimed in claim 1, wherein the label is used for communicating the specialized photofinishing goods and/or services to a user and/or a photofinishing system.

12. The method claimed in claim 1, wherein the first instructional information on the label is a designated URL web site for image storage.

13. The method claimed in claim 1, wherein the specialized photofinishing goods and/or services are selected from the group consisting of image-wise treatments including black and white photos, underwater correction, enhanced color, muted color, rotoscoping, cartooning, sepia coloration, and/or ancillary image products including disc storage, URL storage, e-mailing images, photo books, sticker prints, bigger prints, smaller prints, and calendars.

14. A photofinishing system, comprising:

a) a means for labeling a one-time-use camera with a first instructional information that identifies particular photofinishing goods and/or services to be applied to images captured by the one-time-use camera;

b) a means for capturing the first instructional information from a label;

c) means for displaying a second instructional information based on the first instructional information; and d) means for capturing the second instructional information onto a film residing in the one-time-use camera and resulting in a latent image, the second instructional information for use by a photofinisher to produce the particular photofinishing goods and/or services from user captured latent images on the film.

15. The photofinishing system claimed in claim 14, wherein the first instructional information is machine readable code.

16. The photofinishing system claimed in claim 14, wherein the first instructional information is human readable code.

17. The photofinishing system claimed in claim 14, wherein the second instructional information is a data frame on the film.

18. The photofinishing system claimed in claim 14, wherein the first instructional information and the second instructional information are the same.

19. The photofinishing system claimed in claim 14, wherein the second instructional information provides an ID that is used to identify a particular photofinishing instruction stored in a memory database and is used to produce an image to be exposed on the film.

20. The photofinishing system according to claim 14, wherein a developed latent image is used by the photofinisher to determine what photofinishing good and/or service is associated with at least one of captured latent images.

21. The photofinishing system claimed in claim 14, wherein the means for displaying the second instructional information include a computer generated display device.

22. The photofinishing system claimed in claim 14, wherein a close up diopter is used for imaging the second instructional information onto the film.

23. The photofinishing system claimed in claim 14, wherein the second instructional information communicates how captured film images are to be manipulated.

24. The photofinishing system claimed in claim 14, wherein the second instructional information provides instructions to the photofinisher on how to manipulate the images obtained from the film.

25. A method for obtaining photofinishing goods and/or services, comprising the steps of:

a) capturing an image of a billboard associated with photofinishing goods and/or services;

b) forwarding the captured image of the billboard to a photofinisher; and c) obtaining at least one photofinishing goods and/or services according to information associated with the billboard.

26. A method for obtaining photofinishing goods and/or services, comprising the steps of:

a) capturing an image of a first target associated with photofinishing goods and/or services wherein the first target indicates a change to the nature of photofinishing of the images in sequence;

b) capturing an image of a second target associated with photofinishing goods and/or services wherein the second target indicates a return to the original nature of photofinishing of the images in sequence;

c) forwarding the captured image of the first and/or second target to a photofinisher; and d) obtaining at least one photofinishing goods and/or services according to information associated with the first and/or second target.

27. The photofinishing system claimed in claim 14, wherein the second instructional information is read by a processed film image scanner to obtain instructions for providing the particular photofinishing goods or services.

28. The photofinishing system claimed in claim 14, wherein the means for labeling provide unique ID numbers and associated passwords to establish unique URL locations for storing a user's images and means for the user to locate and access these images.

29. A method for obtaining photofinishing goods and/or services, comprising the steps of:

a) capturing an image of a large outdoor display screen associated with photofinishing goods and/or services;
b) forwarding the captured image of the large outdoor display screen to a photofinisher; and
c) obtaining at least one photofinishing goods and/or services according to information associated with the large outdoor display screen.

* * * * *